(12) United States Patent
Setlak et al.

(10) Patent No.: US 8,455,961 B2
(45) Date of Patent: Jun. 4, 2013

(54) ILLUMINATED FINGER SENSOR ASSEMBLY FOR PROVIDING VISUAL LIGHT INDICATIONS INCLUDING IC FINGER SENSOR GRID ARRAY PACKAGE

(75) Inventors: Dale R. Setlak, Melbourne, FL (US); John David McKinney, Palm Bay, FL (US)

(73) Assignee: Authentec, Inc., Melbourne, FL (US)

( * ) Notice: Subject to any disclaimer, the term of this patent is extended or adjusted under 35 U.S.C. 154(b) by 966 days.

(21) Appl. No.: 12/488,092

(22) Filed: Jun. 19, 2009

(65) Prior Publication Data

US 2010/0320553 A1   Dec. 23, 2010

(51) Int. Cl.
*H01L 27/14* (2006.01)
*G06K 9/00* (2006.01)

(52) U.S. Cl.
USPC .............. 257/414; 382/124; 257/E31.095

(58) Field of Classification Search
USPC ............. 257/414, 432, 440, 443, E31.095, 257/E31.11; 382/115, 124, 126; 324/686, 324/658
See application file for complete search history.

(56) References Cited

U.S. PATENT DOCUMENTS

| | | | |
|---|---|---|---|
| 5,953,441 A | 9/1999 | Setlak | 982/124 |
| 6,289,114 B1 | 9/2001 | Mainguet | 382/124 |
| 6,867,850 B2 | 3/2005 | McClurg et al. | 356/71 |
| 7,088,220 B2 | 8/2006 | Kotzin | 340/5.82 |
| 7,200,288 B2 | 4/2007 | Ogura | 382/321 |
| 7,274,808 B2 | 9/2007 | Baharav et al. | 382/124 |
| 7,308,122 B2 | 12/2007 | McClurg et al. | 382/124 |
| 7,361,919 B2 | 4/2008 | Setlak | 250/556 |
| 2002/0188854 A1 | 12/2002 | Heaven et al. | 713/186 |
| 2003/0103686 A1* | 6/2003 | Ogura | 382/321 |
| 2004/0208348 A1 | 10/2004 | Baharav et al. | 382/124 |
| 2004/0252867 A1* | 12/2004 | Lan et al. | 382/124 |
| 2005/0063571 A1 | 3/2005 | Setlak | 382/124 |
| 2005/0108166 A1 | 5/2005 | Colley | 705/44 |
| 2005/0169503 A1 | 8/2005 | Howell et al. | 382/115 |
| 2006/0181521 A1 | 8/2006 | Perreaultl et al. | 345/173 |
| 2006/0280346 A1 | 12/2006 | Machida | 382/124 |
| 2007/0122013 A1* | 5/2007 | Setlak et al. | 382/124 |
| 2007/0133847 A1 | 6/2007 | Ogura | 382/126 |
| 2007/0273658 A1 | 11/2007 | Yli-Nokari et al. | 345/173 |
| 2008/0049988 A1 | 2/2008 | Basile et al. | 382/124 |
| 2008/0082451 A1 | 4/2008 | Schneider et al. | 705/64 |
| 2008/0095412 A1 | 4/2008 | Fujieda et al. | 382/124 |
| 2008/0180408 A1 | 7/2008 | Forstall et al. | 345/177 |

(Continued)

OTHER PUBLICATIONS

Document #: SOF-OPME30-UG-1.0, Softex OmniPass Mobile Edition Ver. 3.0, Users' Guide; 2003-2005 by Softex Incorporated.

*Primary Examiner* — Victor A Mandala
*Assistant Examiner* — Selim Ahmed
(74) *Attorney, Agent, or Firm* — Allen, Dyer, Doppelt, Milbrath & Gilchrist, P.A.

(57) ABSTRACT

A finger sensor assembly may include a circuit board and an integrated circuit (IC) finger sensor grid array package including a grid array on a lower end thereof mounted to the circuit board, and a finger sensing area on an upper end thereof. The finger sensor assembly may further include at least one visible light source carried by the circuit board and a visible light guide optically coupled to the at least one visible light source. The at least one visible light source may at least partially laterally surround the upper end of the IC finger sensor grid array package to provide visual light indications. The IC finger sensor grid array package may also include circuitry for controlling the at least one visible light source.

18 Claims, 5 Drawing Sheets

U.S. PATENT DOCUMENTS

| | | | |
|---|---|---|---|
| 2008/0220752 A1 | 9/2008 | Forstall et al. | 455/415 |
| 2009/0166411 A1 | 7/2009 | Kramer et al. | 235/382 |
| 2009/0169071 A1 | 7/2009 | Bond et al. | 382/124 |
| 2010/0039121 A1* | 2/2010 | Iliev et al. | 324/658 |

* cited by examiner

ILLUMINATED FINGER SENSOR ASSEMBLY FOR PROVIDING VISUAL LIGHT INDICATIONS INCLUDING IC FINGER SENSOR GRID ARRAY PACKAGE

FIELD OF THE INVENTION

The present invention relates to biometric sensing, and more particularly to finger sensor assemblies providing visual indications and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

As portable electronic devices become increasingly smaller in size, space within each portable electronic device is becoming limited for including additional hardware features. For example, fingerprint sensors are becoming increasingly popular for use within an electronic device, and in particular within a portable electronic device or a mobile wireless communications device, such as a cellular telephone, where space may be limited. Moreover, including a fingerprint sensor in a portable electronic device may increase the overall device footprint. Additionally, as the use of a fingerprint sensor in a portable electronic device becomes increasingly popular, it may be desirable to include additional features.

One particular approach is disclosed in U.S. Patent Application Publication No. 2006/0181521 to Perreault et al., which discloses a system for dynamically illuminating sensors. A dynamic illuminator is positioned next to a contact surface of a touch sensor and is used to display a status of the touch sensor.

Another approach is disclosed in U.S. Patent Application Publication No. 2007/0133847 to Ogura. Ogura discloses an image input device and includes a light guide and covers infrared light emitting diodes surrounding the periphery of a light sensor. The light guide guides emitted light to a finger placed on the light sensor.

SUMMARY OF THE INVENTION

In view of the foregoing, it is therefore an object of the present invention to provide a finger sensor assembly that is relatively compact in size, relatively easy to install in an electronic device, and provides visual light indications.

These and other objects, features, and advantages in accordance with the present invention are provided by a finger sensor assembly which may include a circuit board and an integrated circuit (IC) finger sensor grid array package including a grid array on a lower end thereof mounted to the circuit board, and a finger sensing area on an upper end thereof. The finger sensor assembly may further include at least one visible light source carried by the circuit board, and a visible light guide optically coupled to the at least one visible light source. The at least one visible light guide may at least partially laterally surround the upper end of the IC finger sensor grid array package to provide visual light indications, for example. The IC finger sensor grid array package may also include circuitry for controlling the at least one visible light source. Accordingly, the finger sensor assembly is relatively small or compact in size, relatively easy to install in an electronic device, and provides visual light indications.

The visible light guide may include a base adjacent the circuit board. The visible light guide may also include an illumination ring extending upwardly from the base. The illumination ring may laterally surround the upper end of the IC finger sensor grid array package.

The base and the illumination ring may be integrally formed as a molded unit, for example. The illumination ring may also have a concave upper surface to provide a user friendly finger positioning guide.

The grid array may be a ball grid array, for example. The at least one visible light source may include at least one light emitting diode (LED), such as at least one multicolor LED. Control circuitry may drive the at least one multicolor LED based upon a status, such as a status of the IC finger sensor grid array package, for example. Additionally, the at least one visible light source may generate visible light in a lateral direction parallel to the circuit board.

Another aspect is directed to a method of making a finger sensor assembly. The method may include mounting an IC finger sensor grid array package having a finger sensing area on an upper end and having a grid array on a lower end thereof to a circuit board. The method may also include coupling at least one visible light source to the circuit board to be controlled by circuitry of the IC finger sensor grid array package. The method may further include optically coupling a visible light guide to the at least one visible light source and at least partially laterally surrounding the upper end of the IC finger sensor grid array package to provide visual light indications.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
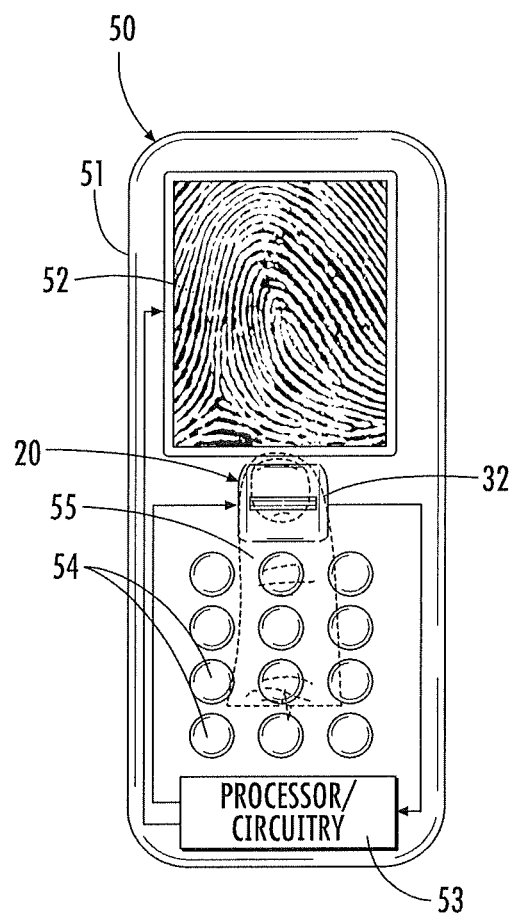
FIG. 1 is a schematic plan view of a cellular telephone including a finger sensor assembly in accordance with the present invention.

Referring initially to FIG. 1, an embodiment of a finger sensor assembly 20 in accordance with the present invention is now described. The finger sensor assembly 20 is illustratively mounted on an exposed surface of a cellular telephone 50. Of course, the finger sensor assembly 20 can also be used other portable and stationary electronic devices as well.

The cellular phone 50 includes a housing 51, a display 52 carried by the housing, and processor/operating circuitry 53 also carried by the housing and connected to the display and to the finger sensor assembly 20. An array of input keys 54 are also provided and used for conventional cellphone dialing and other applications as will be appreciated by those skilled in the art.

Figure 2:
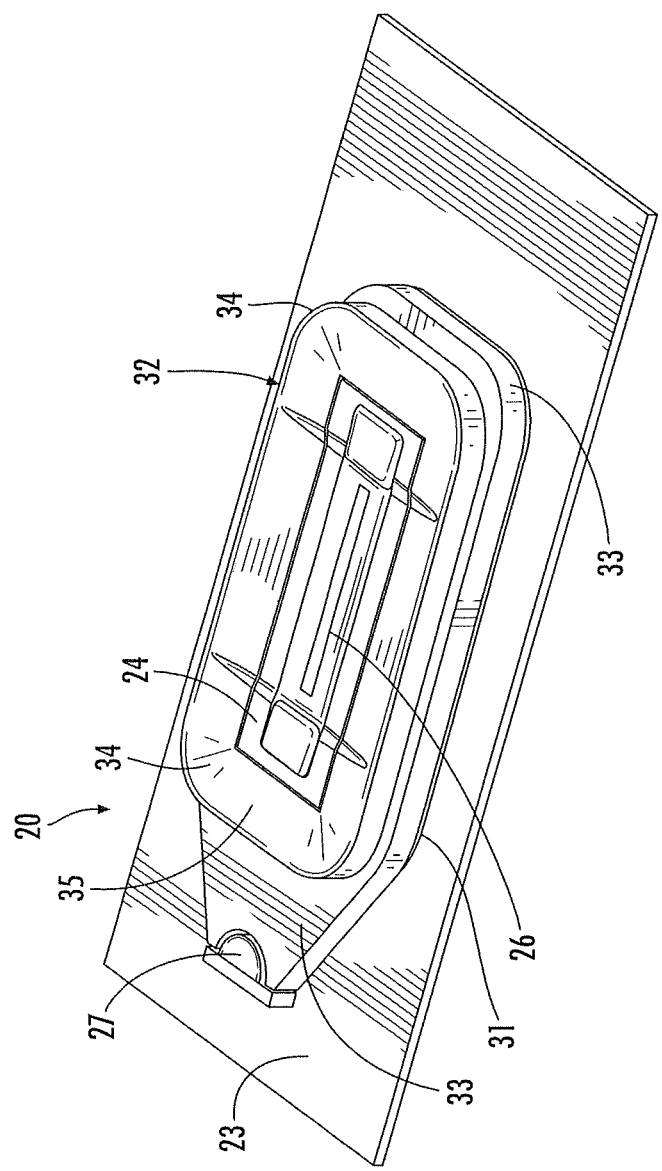
FIG. 2 is a perspective view of the finger sensor assembly of FIG. 1.
Figure 3:
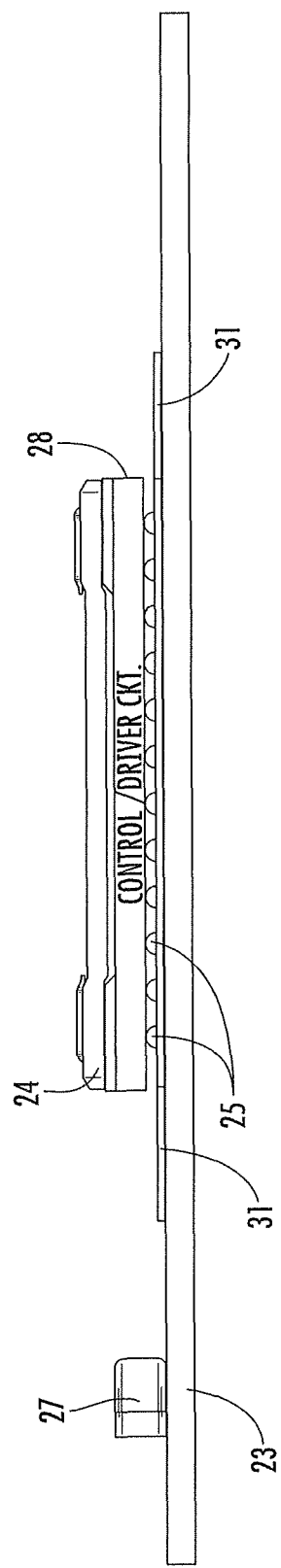
FIG. 3 is a side view of a portion of the finger sensor assembly of FIG. 1.
Figure 4:
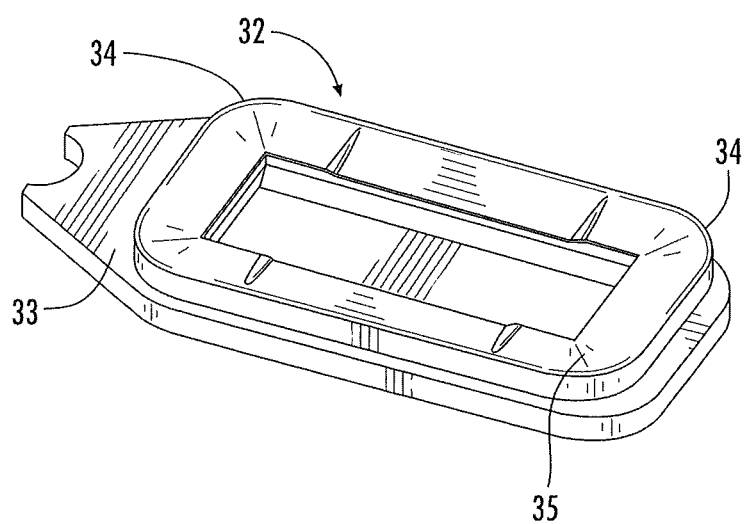
FIG. 4 is a perspective view of the light guide of the finger sensor assembly of FIG. 3.

Referring additionally to FIGS. 2-4, the finger sensor assembly 20 includes a circuit board 23, and an integrated circuit (IC) finger sensor grid array package 24 mounted on the circuit board. The IC finger sensor grid array package 24 illustratively includes a ball grid array 25 on a lower end thereof mounted to the circuit board 23, and a finger sensing area 26 on the upper end thereof. The ball grid array 25 advantageously provides increased ease in assembly and integration. For example, the use of the ball grid array 25 allows the finger sensory package to be readily and quickly installed, and, thus, production and assembly costs are reduced. As will be appreciated by those skilled in the art, other grid arrays may be included in the IC finger sensor grid package 24, such as a land grid array, for example.

The IC finger sensor grid array package 24 is illustratively a slide type finger sensor, for example where the user's finger 55 slides over the sensing area 26 to generate a sequence of finger images. Alternatively, the finger sensor IC finger sensor grid array package 24 could be of the static placement type, where the user simply places his finger 55 onto the sensing surface to generate a finger image. Other types of sensors may be used, as will be appreciated by those skilled in the art.

The finger sensor assembly 20 further includes a visible light emitting diode (LED) 27 that is multicolor and coupled to the circuit board 23. For example, a single red, green, and blue multicolor LED may be used. The multicolor LED 27 is also advantageously a standard size commercially available multicolor LED, which allows a reduced production cost. In other embodiments the visible LED 27 may be a single color LED. Other visible light sources may be used, as will be appreciated by those skilled in the art. The multicolor LED 27 generates visible light in a lateral direction parallel to the circuit board 23 to uniformly illuminate the area around the IC finger sensor grid array package 24.

Control/driver circuitry 28 included on the IC finger sensor ball grid array package 24 may drive the multicolor LED 27 based upon a status of the IC finger sensor ball grid array package. In other embodiments, the control/driver circuitry 28 may be located outside the IC finger sensor ball grid array package 24 and operate in cooperation with the processor/circuitry 53 to provide other functionality, as will be appreciated by those skilled in the art. The multicolor LED 27 may be driven by the circuitry 28 to illuminate green upon a successful finger sensing, illuminate red upon an unsuccessful finger sensing, illuminate blue in a ready to sense state, or not illuminate at all in an off state, for example. Other colors may be used to represent a given status. In embodiments where the visible LED 27 is a single color LED, the control/driver circuitry 28 may drive it to an on state upon a successful finger sensing.

In some embodiments, the control/driver circuitry 28 may include LED drivers to provide control of the illumination. The LED drivers may include three independent channels, where each LED driver is a constant current sink with four programmable current levels. Independent switch control of each LED driver and its current level advantageously allows a large variety of colors and integrated optical functionality, for example, fading, and sensor feedback. The duty cycle value may be re-mapped to an exponential curve to compensate for perceived light intensity.

In some embodiments, the control/driver circuitry 28 may also include a universal serial bus (USB) clock recovery function. The USB clock recovery advantageously reduces the need for an external crystal and components. For example, the IC finger sensor grid array package 24 may use an internal clock, and thus no external components may be desirable, as the internal clock may be calibrated to 48.000 MHz+/−XXX % using a frame signal timing that is produced by a USE host controller every 1 mS. Current limiting may be included in the control/driver circuitry 28 for physical damage protection, and an integrated 1.8-volt regulator may also be included in the circuitry for current reduction of digital core circuitry, as will be appreciated by those skilled in the art. The control/driver circuitry 28 may also cooperate with an audio transducer (not shown) to provide audio feedback based on finger sensing.

An adhesive layer 31 is illustratively coupled to the circuit board 23 adjacent the lower end of the IC finger sensor grid array package 24. The adhesive layer 31 surrounds the lower end of the IC finger sensor grid array package 24 for securing the visible light guide 32 to the circuit board 23.

The visible light guide 32 is illustratively optically coupled to the visible multicolor LED 27. More particularly, the visible light guide 32 laterally surrounds the upper end of the IC finger sensor grid array package 24 to provide visual light indications, as noted above. As illustrated, the IC finger sensor grid array package 24 fits in an opening or cutout provided therein, the opening being fitted to the IC finger sensor grid array package. In other embodiments, the visible light guide 32 may only partially surround the upper end of the IC finger sensor grid array package 24.

As illustrated perhaps best in FIG. 4, the visible light guide 32 includes a base 33 adjacent the circuit board 23, and an illumination ring 34 extending upwardly from the base. The base 33 couples with the adhesive layer 31 in the area surrounding the lower end of the IC finger sensor grid array package 24. The base 33 also illustratively extends outwardly from one side of the lower end of the IC finger sensor ball grid array package 24 and optically couples with the multicolor LED 27.

The illumination ring 34 laterally surrounds the upper end of the IC finger sensor ball grid array package 24 and is fitted through the housing 51 of the cellular telephone 50. Adjacent portions of the device housing 51 advantageously rest on the base 33. This configuration advantageously reduces the amount of components and overall height of the finger sensor assembly 20.

As will be appreciated by those skilled in the art, the illumination ring 34 also has a concave upper surface 35. The concave upper surface 35 advantageously may guide a user's finger in proper placement on the finger sensing area 26.

The base 33 and the illumination ring 34 may be integrally formed as a molded unit and may be a transparent plastic manufactured using an In Mold Decorating (IMD) process. The IMD process advantageously allows for controlling the size, location, and shape of the final decorated finish of the illumination ring 34. Other materials and forming processes may be used, and the visible light guide 32 may be translucent, for example, as will be appreciated by those skilled in the art. Additionally, IMD processed surfaces of the visible light guide 32 can be metallized to control the flow of optical flux and reduce stray light. Brightness enhanced films may also be used to improve illumination.

Figure 5:
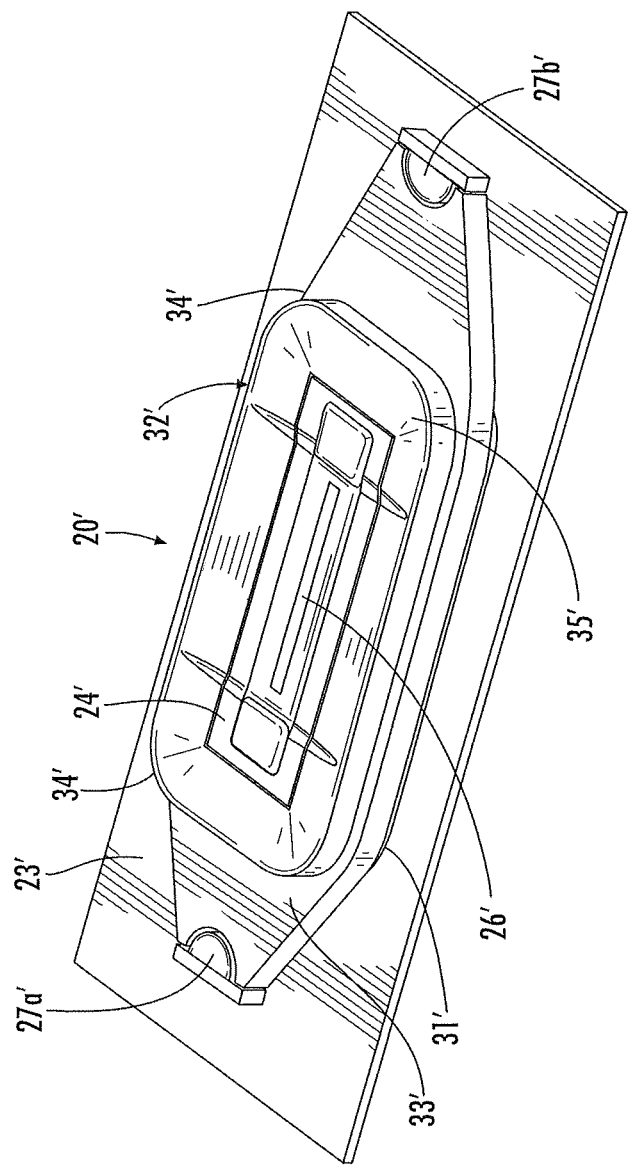
FIG. 5 is a perspective view of another embodiment of the finger sensor assembly of FIG. 2.

Referring now to FIG. 5, in another embodiment, two visible LEDs 27a', 27b' may be used at opposing ends of the finger sensor assembly 20' to provide additional visual light indications. The base 33' of the visible light guide 32' may extend outwardly from opposing ends of the finger sensor assembly 20' to couple with each of the two visible multicolor LEDS 27a', 27b'. As will be appreciated by those skilled in the art, more LEDS may be used.

Another aspect is directed to a method of making a finger sensor assembly 20. The method includes mounting an IC finger sensor grid array package 24 having a finger sensing area 26 on an upper end thereof and a grid array 25 on a lower end thereof to a circuit board 23. The method also includes coupling a visible light source 27 to the circuit board 23 to be controlled by circuitry 28 of the IC finger sensor package 24. The method also includes optically coupling a visible light guide 32 to the visible light source 27 to at least partially laterally surround the upper end of the IC finger sensor ball grid array package 24 to provide visual light indications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A finger sensor assembly comprising:
   a circuit board;
   an integrated circuit (IC) finger sensor grid array package comprising a grid array on a lower end thereof mounted to said circuit board, and a finger sensing area on an upper end thereof;
   at least one visible light source carried by said circuit board; and
   a visible light guide optically coupled to said at least one visible light source and at least partially laterally surrounding the upper end of said IC finger sensor grid array package to provide visual light indications;
   said IC finger sensor grid array package also comprising circuitry for controlling said at least one visible light source.

2. The finger sensor assembly according to claim 1 wherein said visible light guide comprises:
   a base adjacent said circuit board; and
   an illumination ring extending upwardly from said base.

3. The finger sensor assembly according to claim 2 wherein said illumination ring laterally surrounds the upper end of said IC finger sensor grid array package.

4. The finger sensor assembly according to claim 2 wherein said base and said illumination ring are integrally formed as a molded unit.

5. The finger sensor assembly according to claim 2 wherein said illumination ring has a concave upper surface.

6. The finger sensor assembly according to claim 1 wherein said grid array comprises a ball grid array.

7. The finger sensor assembly according to claim 1 wherein said at least one visible light source comprises at least one light emitting diode (LED).

8. The finger sensor assembly according to claim 1 wherein said at least one visible light source comprises at least one multicolor light emitting diode (LED).

9. The finger sensor assembly according to claim 8 wherein said control circuitry drives the at least one multicolor LED based upon a status of said IC finger sensor grid array package.

10. The finger sensor assembly according to claim 1 wherein said at least one visible light source generates visible light in a lateral direction parallel to said circuit board.

11. A finger sensor assembly comprising:
    a circuit board;
    an integrated circuit (IC) finger sensor ball grid array package comprising a ball grid array on a lower end thereof mounted to said circuit board, and a finger sensing area on an upper end thereof;
    at least one visible light source carried by said circuit board; and
    a visible light guide optically coupled to said at least one visible light source and at least partially laterally surrounding the upper end of said IC finger sensor ball grid array package to provide visual light indications, said visible light guide comprising
    a base adjacent said circuit board, and
    an illumination ring extending upwardly from said base;
    said IC finger sensor ball grid array package also comprising circuitry for controlling said at least one visible light source.

12. The finger sensor assembly according to claim 11 wherein said illumination ring laterally surrounds the upper end of said IC finger sensor ball grid array package.

13. The finger sensor assembly according to claim 11 wherein said base and said illumination ring are integrally formed as a molded unit.

14. The finger sensor assembly according to claim 11 wherein said illumination ring has a concave upper surface.

15. The finger sensor assembly according to claim 11 wherein said at least one visible light source comprises at least one light emitting diode (LED).

16. The finger sensor assembly according to claim 11 wherein said at least one visible light source comprises at least one multicolor light emitting diode (LED).

17. The finger sensor assembly according to claim 16 wherein said control circuitry drives the at least one multicolor LED based upon a status of said IC finger sensor ball grid array package.

18. The finger sensor assembly according to claim 11 wherein said at least one visible light source generates visible light in a lateral direction parallel to said circuit board.

* * * * *